July 28, 1931.    V. CASTORINA    1,816,176
VEHICLE TIRE
Filed Nov. 10, 1928
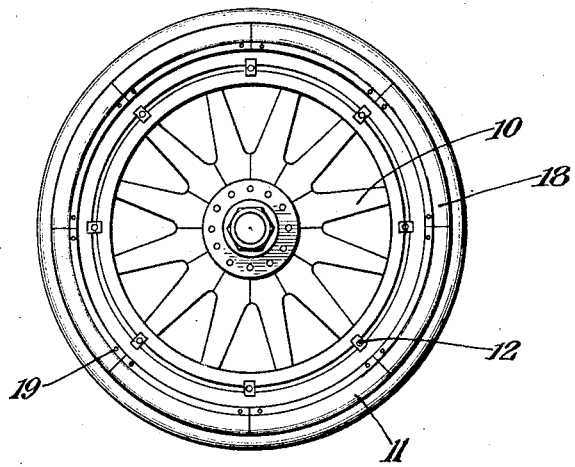
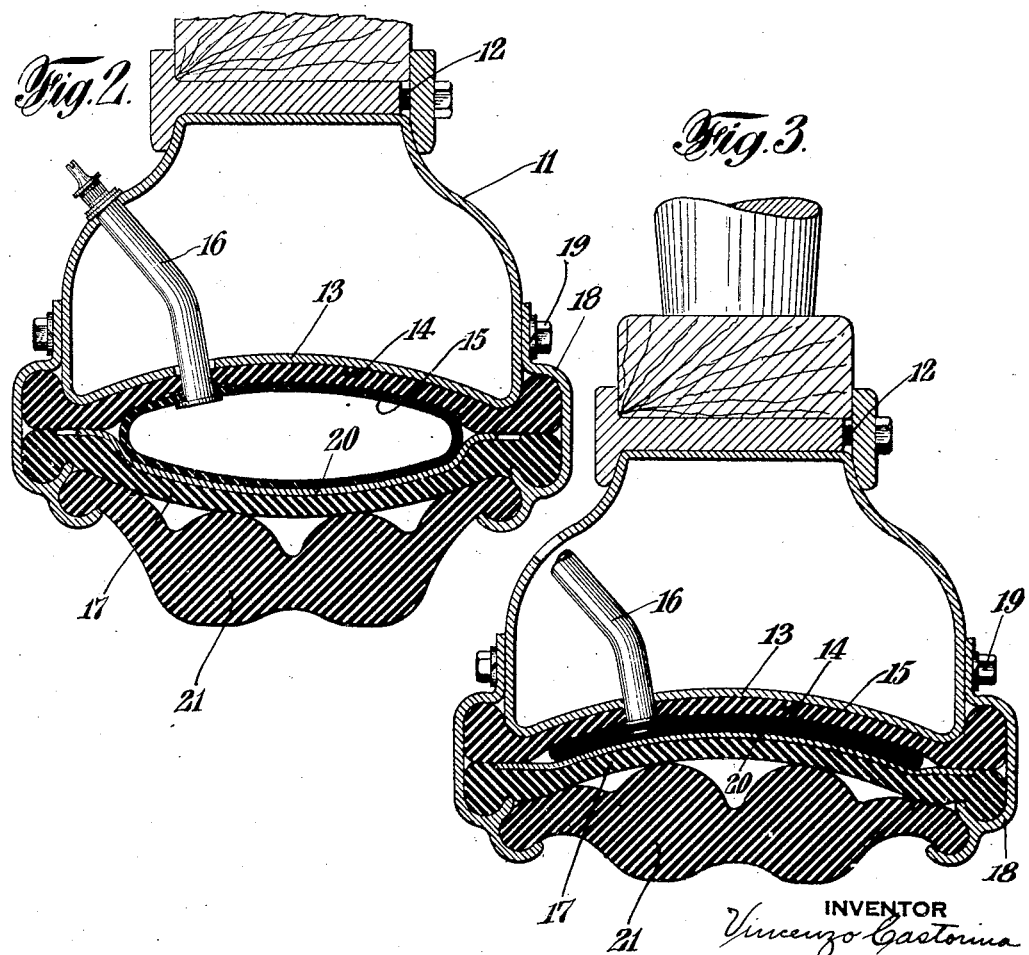
INVENTOR
Vincenzo Castorina
BY
Kenyon & Kenyon
ATTORNEYS Patented July 28, 1931

1,816,176

UNITED STATES PATENT OFFICE

VINCENZO CASTORINA, OF WEST NEW YORK, NEW JERSEY

VEHICLE TIRE

Application filed November 10, 1928. Serial No. 318,430.

This invention relates to vehicle tires, and has as an object the provision of a pneumatic vehicle tire, which is substantially puncture proof, but which can be utilized as a solid tire in the event of a puncture.

According to this invention, the pneumatic tube is arranged in a chamber formed by an inner and outer strip of solid rubber mounted on the periphery of a metal rim which is of hollow construction with its outer wall concave. The outer strip is provided with a flexible metal liner which is effective to prevent the passage of nails or the like through the same. A thick rubber tread overlies the above mentioned outer strip and provides additional protection for the pneumatic tube as well as acts as the wearing surface of the tire. The various elements comprising the tire are held on the rim by means of detachable arcuate members and make it possible to renew the tread member as it becomes worn, without necessitating replacement of any of the other parts.

The above described arrangement affords further substantial protection to the pneumatic tube against puncture while retaining the pneumatic effect desirable for motor vehicles. However, should the pneumatic tube become deflated for any reason, the tire may still be used. In such circumstances, the tread member and rubber layers are pressed against the metal rim, but the outer surface of the tread member projects sufficiently beyond the metal parts of the wheel to function in the manner of solid rubber tires.

Other objects, novel features and advantages of this invention will be apparent from the following specification and accompanying drawings, wherein Fig. 1 is a side elevation of a wheel equipped with a tire embodying the invention.

Fig. 2 is an enlarged section through the rim of the wheel disclosed in Fig. 1, and Fig. 3 is a similar section with the pneumatic tube deflated.

The wheel 10 is similar to the standard artillery automobile wheel and has mounted thereon a rim 11 which is held in place by the rim bolts 12. The rim 11, which is of hollow construction, is made concave along its periphery to provide an annular seat 13. A strip of solid rubber 14 lies in the seat 13 and is surrounded by a pneumatic tube 15 provided with a valve stem 16 which extends inwardly through both the strip 14 and the rim 11.

A second strip 17 of solid rubber overlies the pneumatic tube 15 and has its edges in contact with the edges of the strip 14. These strips are held in assembled relation to the rim 11 by means of arcuate clamps 18 having sockets to receive beads formed on the edges of such strips, the clamping members being attached to the rim by bolts 19. A flexible metal shield 20 is carried by the inner face of the strip 17 and has its edges extending along the junction between the two strips 14 and 17, the strip 17 being cut away to permit easy movement of such edges. A thick solid rubber tread member 21 overlies the strip 17 and is provided with beads fitting into sockets in the clamping members 18 for holding the tread member in assembled relation to the remaining parts of the tire.

The pneumatic tube 15 is rendered substantially puncture proof by the protection afforded by the thick tread member 21 and the metal shield 20. A short nail or the like cannot penetrate the tread 21 because of its thickness and a longer nail or the like will be turned away from the pneumatic tube by shield 20. However, should the air leak out of the pneumatic tube for any reason, the tire is still capable of being used. Under such circumstances, the various parts assume the relationship shown in Fig. 3, and the tread 21, together with the strips 14 and 17, constitute a solid tire upon which the wheel may run. The pneumatic tube will be held tightly between the layers 14 and 17 and will not be harmed by the use of the tire, while the tube is deflated.

The above described tire will last practically indefinitely for as the tread 21 becomes worn it may be removed and a new tread substituted. The removal of this tread may be effected by removing the clamping members 18, thus permitting disengagement of the same from the beads on the tread. After a new tread has been applied, the clamping members may be again attached to the rim. Since the rim 11 is of hollow construction and its outer wall is relatively thin, it is somewhat resilient, which adds to the riding qualities of a wheel equipped therewith, especially should the inner tube become deflated. The edges of the shield 20 move laterally whenever the strip 17 is pressed inwardly thus preventing buckling of the shield and permitting free movement of the same.

It is, of course, understood that various modifications may be made in the structure above described without in any way departing from the spirit of the invention as defined in the appended claim.

I claim:

A device of the character described, comprising a hollow rim having a concave peripheral wall, a solid rubber strip lying in the groove thus formed and having beads overlying the edges of the peripheral wall, a second solid rubber strip defining an annular chamber with said first strip and having beads along its edges, a pneumatic tube arranged in said chamber, a tread member separate from said second strip overlying said strip and having beads along its edges, arcuate clamping members detachably mounted on said rim, said clamping members having sockets to receive the beads on the edges of said strips and tread member, and a circular metallic shield overlying said pneumatic tube and having its edges slidably held between the edges of the two rubber strips.

In testimony whereof I have signed my name to this specification.

VINCENZO CASTORINA.